Figure 1:
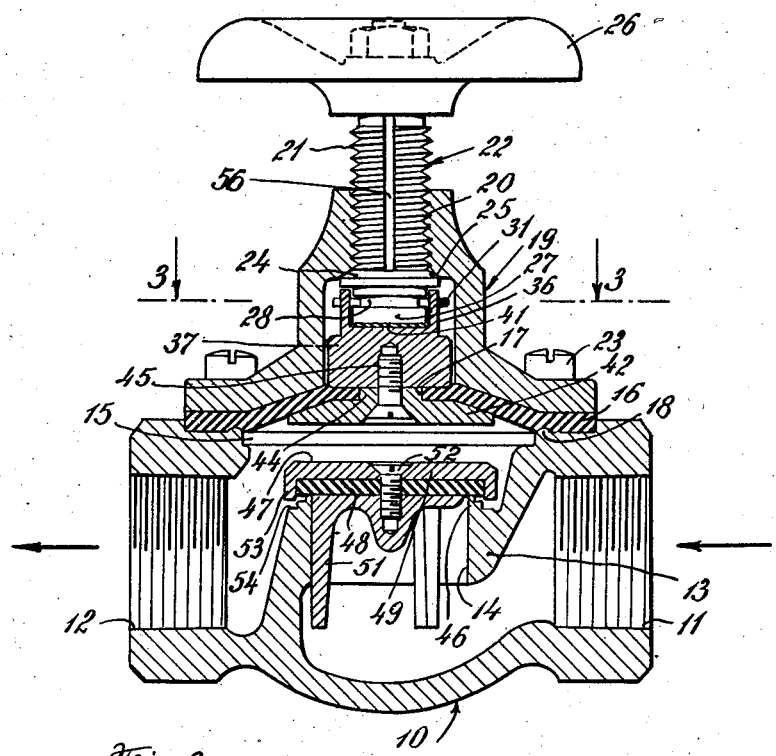

March 15, 1949.  H. HOOPER  2,464,400
COMBINED LINE AND CHECK VALVE
Filed Aug. 22, 1944

INVENTOR
Harry Hooper
BY
Pennie, Davis, Marvin and Edmonds
his ATTORNEYS

Patented Mar. 15, 1949

2,464,400

UNITED STATES PATENT OFFICE 2,464,400

COMBINED LINE AND CHECK VALVE

Harry Hooper, New York, N. Y., assignor to Air Reduction Company, Incorporated, a corporation of New York Application August 22, 1944, Serial No. 550,520

3 Claims. (Cl. 251—139)

This invention relates to a combined line and check valve wherein the valve element therein serving normally as a check valve, is, when supplemented by means operable against the valve element, adapted to render the valve serviceable as a line or stop valve for a pipe line.

It is an object of the present invention to provide a combined line and check valve incorporating a diaphragm, in lieu of the usual packing, for preventing leakage between the operating screw and the bonnet through which the screw is operated.

It is another object of the invention to provide a valve which is compact, of simple construction, which may be quickly opened or closed with little force and one which will offer low pressure drop to fluid flow.

It is another object of the invention to provide in a valve of a type in which a diaphragm is movable in effecting the opening and closing of the valve, an axially adjustable operating means in which a positive metal-to-metal contact is felt by the operator, the same as is felt in ordinary valves not of the diaphragm type, when its adjusting screw is operated to close the valve.

It is still another object of the invention to provide in an axially adjustable means for operating a valve which includes relatively rotatable parts, bearing material to take up the thrust and minimize the friction between the parts.

According to the present invention, a valve body is provided with a partition between its inlet and outlet in which there is an opening over which is fitted a check valve having a soft rubber face adapted to be compressed over an annular lip on the partition to check against a reversal of fluid flow through the valve and a metal flange adapted to engage in metal-to-metal contact with an annular face on the partition when a heavy force is applied to the valve element. Aligned with the check valve to be adjusted through a large opening, over which is secured a flexible diaphragm with an aperture therein and a bonnet, is an axially adjustable means connected to the diaphragm in a fluid-tight manner with at least one of its clamping parts for effecting the connection with the diaphragm extending through the aperture therein so as to be in metal-to-metal contact with the other clamping part, and adjustable through the bonnet and the valve body opening to secure the check valve upon the partition so that the valve may serve as a line or stop valve. By virtue of the metal-to-metal contact of the check valve flange with the partition and by extension of the adjustable means clamping part through the diaphragm aperture, a tight feel of the valve is imparted to the operator as the check valve is secured to its seat. The metal-to-metal contact of the check valve flange and the partition also serves as a gas tight seal should the rubber seating material become damaged. The adjusting or operating screw itself forming a part of the axially adjustable means has a conical seat adapted to bear against a cooperating seat in the bonnet, when the adjustable means is retracted to free the check valve, to serve as a seal should the diaphragm become broken. Bearing material is provided on one of the relatively rotatable parts of the adjustable means to minimize friction between the parts as the adjustable means is operated to secure the check valve to its seat.

Figure 2:
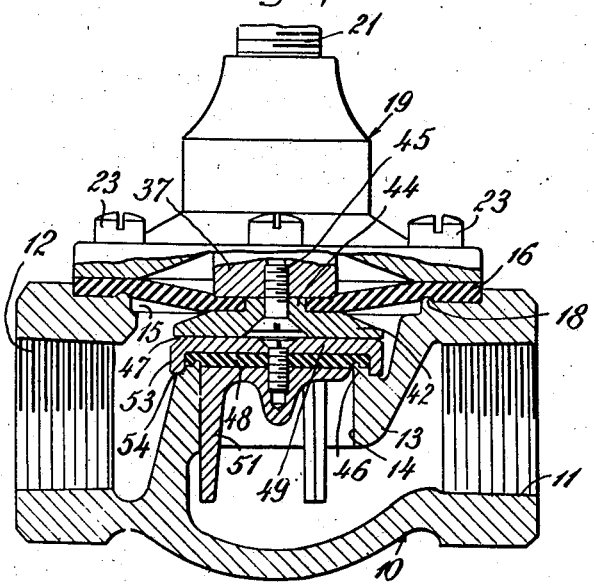
Figure 3:
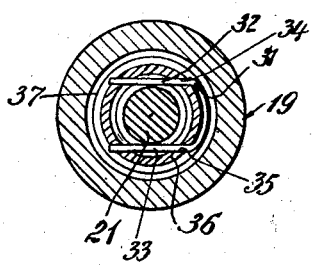

For other objects and for a better understanding of the invention, reference may be had to the following detailed description taken in connection with the accompanying drawing, in which Fig. 1 is a cross-sectional view, in elevation, with the diaphragm and adjustable screw means retracted to permit the normal functioning of the check valve;

Fig. 2 is an elevational view, partly in cross-section and partly in full, showing the diaphragm and the operating screw means adjusted to secure the check valve over its opening so that the valve is serving as a stop valve for the line; and Fig. 3 is a cross-sectional view taken generally in the region indicated at 3—3 of Fig. 1, and illustrating in plan the swivel connection of the relatively rotatable parts.

Referring now to the figures, there is shown a valve body 10 having an inlet 11, an outlet 12, and a partition 13 between the inlet and the outlet in which there is a check valve opening 14, and an opening 15 located above the check valve opening 14. Fitted over the opening 15 is a flexible diaphragm 16 in which there is a central aperture 17. The bottom face of this diaphragm 16 is adapted to be flexed through the opening 15 over an annular projection 18 on the valve body 10.

Fitted over the diaphragm 16 is a bonnet 19 having a threaded opening 20 through which is adjusted a screw 21 forming a part of an axially adjustable means 22. The bonnet and the diaphragm are secured to the body 10 by fastening screws 23.

The adjusting screw 21 has on its lower end a conical face 24 adapted to engage a conical face 25 in the bonnet when the adjusting screw 21 is turned by means of its handle 26 to a retracted position. When in this retracted position, the conical faces 24 and 25 serve as a seal to prevent leakage flow along the adjusting screw 21 should the diaphragm 16 be broken and leakage fluid be permitted within the bonnet 19.

Also, on the lower end of the adjustable screw 21, is a projection or portion 27 having an annular groove 28 adapted to receive a U-pin 31 having its legs 32 and 33 extending respectively through openings 34 and 35, in a cylindrical wall 36 forming a recess in the top of a clamping part 37 adapted to receive the projection 27. The adjusting screw is thus rotatably connected to the clamping part 37 to provide the relatively rotatable parts of the adjustable means 22. Bearing material 41 is provided in the bottom of the recess against which the end portion 38 of the adjusting screw 21 may bear. By the provision of this bearing material, thrust is taken up between the parts and friction between the adjusting screw 21 and the clamping part 37 is minimized.

To the clamping part 37, there is connected another clamping part or plate 42 having a projection 44 adapted to extend through the aperture 17 of the diaphragm and into metal-to-metal contact with the clamping part 37. When the clamping plate 42 is tightened against the clamping part 37 by a clamping screw 45, the diaphragm material about the aperture 17 is firmly compressed and fluid-tightly connected to the axially adjustable means 22. By virtue of such connection of the axially adjustable means to the diaphragm, a metal-to-metal feel is had through the diaphragm when the adjustable means is turned to close the valve.

About the opening 14 and formed on the partition 13, is an annular lip 46 against which a check valve element 47 is adapted to seat. This check valve element 47 includes a soft rubber facing 48 connected between a protecting cover plate 49 and a guide 51 by a screw 52. The check valve element 47 is normally held on the partition by gravity but is light enough in weight so that it can be raised easily by fluid pressure from the inlet 11. As the valve element is lifted by fluid pressure, it is guided in the opening 14 by the guide 51. The clearance above the valve element, when the diaphragm is retracted, Fig. 1, is such as to permit the valve element to open wide enough to give a total fluid opening about the check valve equivalent in area to the valve inlet or outlet.

The cover plate 49 has an annular flange 53, the lower edge of which is adapted to bear in metal-to-metal contact against an annular stop surface 54, as the axially adjustable means is moved to the position shown in Fig. 2 to secure the check valve 47 over the opening 14. In this operation soft rubber facing 48 is compressed by the annular lip 46 and the flange 53 brought into contact with the annular stop surface 54. The cover plate 49 with its flange 53 serves to protect the soft rubber facing 48 from overstrain. Since the connection of the adjustable means through the diaphragm is such as to give a metal-to-metal contact of its clamping parts, the engaging of flange metal of the check valve with the annular stop surface of the partition is readily imparted through the adjustable means to the operator.

With the check valve retained on the partition by the adjustable means, Fig. 2, any leakage resulting from a rupture to the diaphragm is positively cut off, the flow through the valve being from the right and toward the left, and the fluid thereby being retained at the inlet side by the valve. With the valve released and the diaphragm ruptured, leakage through the bonnet is prevented by the tight engagement of the conical face 24 of the screw 21 with the conical face 25 of the bonnet.

A groove 56 is cut along the side of the adjusting screw to extend the full length of the threaded portion thereof and to provide a recess for the retention of lubricating fluid and to receive metal particles or other hard matter that might otherwise become lodged, in the threads and cause damage thereto.

It should now be apparent that there has been provided a combined line and check valve wherein packing for the adjusting screw is unnecessary and wherein the metal-to-metal contact feeling of standard valves is had in closing the valve. Also, that there has been provided a combined line and check valve which offers a low pressure drop to fluid flow, which is of simple construction, compact in size, and quickly opened and closed with little force.

I claim:

1. A combined line and check valve of the diaphragm type comprising a body having an inlet and an outlet and a metal partition therebetween with a check valve opening therethrough, a lip encircling said opening and constituting a valve seat, a metallic check valve normally freely operable over the check valve opening and having a rubber facing cooperating with said lip, said facing being set in the check valve to leave an encircling annular flange of metal whereby when the check valve is forcibly closed the check valve will make metal-to-metal contact with the partition, said body having an opening above the check valve opening, a flexible diaphragm with an aperture therein fitted over the body opening, a bonnet fitted over the diaphragm, means for securing the diaphragm and bonnet to the body, a metal plate on the underside of the diaphragm in position to contact with the top of the metallic check valve when the diaphragm is flexed downward, a metal part on the outer side of the diaphragm, means clamping the plate and said metal part against opposite sides of the diaphragm in a fluid-tight seal and with a metal-to-metal connection between the plate and the outer clamping part, an operator-actuated element outside of the valve body, motion transmitting means connected to the operator-actuated element and extending through the bonnet to the metal clamping part that clamps against the outside of the diaphragm, and a connection between said clamping part and the lower end of the motion transmitting means for flexing said diaphragm upward out of contact with the check valve or pushing the metal plate into contact with the check valve to force the check valve closed under pressure and transmit a metal-to-metal contact feeling back to the operator.

2. A combined line and check valve comprising a valve body in which there is a partition with an opening for the flow of fluid, a metallic check valve element at the downstream end of said opening, a flexible diaphragm forming one wall of the space in the valve body directly downstream from the check valve element, a metal plate on the underside of the diaphragm in position to contact with the top of the metallic check valve when the diaphragm is flexed downward, a metal part on the outer side of the diaphragm, means clamping the plate and said metal part against opposite sides of the diaphragm in a fluid-tight seal and with a metal-to-metal connection between the plate and the outer clamping part, an operator-actuated element outside of the valve body, axially adjustable means extending from said element and through the valve body above the diaphragm, and a connection between said clamping part and the lower end of the axially adjustable means for flexing said diaphragm upward out of contact with the check valve or pushing the metal plate into contact with the check valve to force the check valve closed under pressure and transmit a metal-to-metal contact feeling back to the operator.

3. A combined line and check valve of the diaphragm type comprising a body having an inlet and an outlet and a partition therebetween with a check valve opening therethrough, a check valve normally freely operable over the check valve opening, said body having an opening opposite the check valve opening, a flexible diaphragm fitted over the body opening, a bonnet fitted over the diaphragm, means securing the diaphragm and bonnet to the body, means axially adjustable through the bonnet and connected to the diaphragm to force the check valve closed in order that the check valve also may serve as a line valve, said axially adjustable means including clamping parts located at opposite sides of the diaphragm for retaining the diaphragm in a fluid-tight manner, the inner of said clamping parts extending radially beyond the outer clamping part, and the outer surface of said radially extending portion of the inner part being substantially parallel to the inner surface of the bonnet lying opposite thereto, the bonnet and said inner clamping part being so constructed and arranged that the axially adjustable means may be moved outwardly to an extent sufficient to clamp the diaphragm between said substantially parallel surfaces to thereby seal the valve against leakage through the bonnet opening should the diaphragm become ruptured.

HARRY HOOPER.

REFERENCES CITED

The following references are of record in the file of this patent:

UNITED STATES PATENTS

| Number | Name | Date |
|---|---|---|
| 542,126 | Winther | July 2, 1895 |
| 930,635 | Warter | Aug. 10, 1909 |
| 1,007,560 | Grantland | Oct. 31, 1911 |
| 1,226,040 | Whitbeck | May 15, 1917 |
| 1,437,750 | Ehemann | Dec. 5, 1922 |
| 1,787,236 | Dopp | Dec. 30, 1930 |
| 1,939,363 | Pearson | Dec. 12, 1933 |
| 2,043,798 | Hyatt | June 9, 1936 |

FOREIGN PATENTS

| Number | Country | Date |
|---|---|---|
| 8,246 | Great Britain | 1889 |
| 11,473 | Germany | 1879 |
| 511,264 | Germany | 1930 |